(12) United States Patent
Maes et al.

(10) Patent No.: US 9,791,319 B2
(45) Date of Patent: Oct. 17, 2017

(54) INFRARED THERMAL SENSOR WITH BEAMS HAVING DIFFERENT WIDTHS

(71) Applicant: Melexis Technologies N.V., Tessenderlo (BE)

(72) Inventors: Ben Maes, Lommel (BE); Carl Van Buggenhout, Aalst (BE); Appolonius Jacobus Van Der Wiel, Duisburg (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 414 days.

(21) Appl. No.: 14/574,607

(22) Filed: Dec. 18, 2014

(65) Prior Publication Data
US 2015/0177070 A1  Jun. 25, 2015

(30) Foreign Application Priority Data
Dec. 22, 2013 (GB) .................................. 1322827.5

(51) Int. Cl.
*G01J 5/02* (2006.01)
*G01J 5/12* (2006.01)

(52) U.S. Cl.
CPC ............. *G01J 5/0225* (2013.01); *G01J 5/023* (2013.01); *G01J 5/024* (2013.01); *G01J 5/12* (2013.01)

(58) Field of Classification Search
CPC ........ G01J 5/0225; G01J 5/0205; G01J 5/045; G01J 5/023; G01J 5/024; G01J 5/12
See application file for complete search history.

(56) References Cited

U.S. PATENT DOCUMENTS

| 6,046,398 | A | | 4/2000 | Foote et al. | |
|---|---|---|---|---|---|
| 6,163,061 | A | * | 12/2000 | Iida | G01J 5/20 257/414 |
| 6,300,554 | B1 | | 10/2001 | Du et al. | |
| 8,552,380 | B1 | * | 10/2013 | Florin | G01J 5/12 250/338.4 |

(Continued)

FOREIGN PATENT DOCUMENTS

| DE | 40 91 364 A1 | 1/1992 |
|---|---|---|
| GB | 2 154 367 A | 9/1985 |
| JP | 2000-111396 A | 4/2000 |

OTHER PUBLICATIONS

Great Britain Search Report from Application No. GB 1322827.5, dated May 15, 2014.

*Primary Examiner* — Lisa Caputo
*Assistant Examiner* — Philip Cotey
(74) *Attorney, Agent, or Firm* — Workman Nydegger

(57) ABSTRACT

An infrared thermal sensor for detecting infrared radiation is described. It comprises a substrate and a cap structure together forming a sealed cavity. A membrane is suspended therein by a plurality of beams, each beam comprising at least one thermocouple arranged therein or thereon for measuring a temperature difference between the membrane and the substrate. At least two beams have a different length and each of the thermocouples have a substantially same constant width to length ratio such that the thermal resistance measured between the membrane and the substrate is substantially constant for each beam, and such that the electrical resistance measured between the membrane and the substrate is substantially constant for each beam. The beams may be linear, and be oriented in a non-radial direction.

15 Claims, 6 Drawing Sheets

(56) References Cited

U.S. PATENT DOCUMENTS

| | | | |
|---|---|---|---|
| 2002/0037026 A1* | 3/2002 | Sato | G01J 5/02 374/132 |
| 2003/0141455 A1* | 7/2003 | Lambert | G01J 5/0022 250/353 |
| 2003/0147449 A1* | 8/2003 | Chavan | G01J 5/14 374/137 |
| 2003/0148620 A1* | 8/2003 | Chavan | B81B 3/0072 438/706 |
| 2003/0168598 A1 | 9/2003 | Oda | |
| 2003/0209669 A1* | 11/2003 | Chou | G01N 21/3504 250/343 |
| 2004/0187904 A1* | 9/2004 | Krellner | G01J 5/10 136/213 |
| 2005/0116169 A1 | 6/2005 | Tohyama et al. | |
| 2006/0006333 A1* | 1/2006 | Hirota | G01J 5/12 250/338.1 |
| 2006/0038129 A1* | 2/2006 | Watanabe | G01J 5/12 250/338.1 |
| 2006/0060788 A1* | 3/2006 | Uchida | G01J 5/10 250/343 |
| 2006/0169902 A1* | 8/2006 | Watanabe | G01J 5/12 250/338.1 |
| 2007/0095380 A1* | 5/2007 | Dewes | G01J 5/12 136/224 |
| 2007/0227575 A1* | 10/2007 | Kato | G01J 5/12 136/224 |
| 2008/0216883 A1* | 9/2008 | Leneke | G01J 5/06 136/224 |
| 2010/0258726 A1* | 10/2010 | Zhang | G01J 5/02 250/336.1 |
| 2010/0289108 A1 | 11/2010 | Meinel et al. | |
| 2011/0110394 A1* | 5/2011 | Kaess | G01J 5/0014 374/121 |
| 2011/0147869 A1* | 6/2011 | Lazarov | G01J 5/02 257/432 |
| 2011/0174978 A1 | 7/2011 | Forg et al. | |
| 2011/0182320 A1 | 7/2011 | Noda | |
| 2012/0261785 A1* | 10/2012 | Barlow | G01J 5/12 257/467 |
| 2015/0076651 A1* | 3/2015 | Noguchi | H01L 35/32 257/467 |

\* cited by examiner

INFRARED THERMAL SENSOR WITH BEAMS HAVING DIFFERENT WIDTHS

FIELD OF THE INVENTION

The invention relates to the field of thermal infra-red sensors, more in particular to an infrared thermal sensor comprising a membrane suspended in a cavity by means of a plurality of beams.

BACKGROUND OF THE INVENTION

Thermal infrared sensors (also known as "infrared thermal pixels", although this term is typically only used when an array of sensors is used) comprising a membrane (also known as "diaphragm") suspended in a cavity by means of a plurality of beams (also known as "webs") and having thermocouples arranged in or on said beams with one end located on the membrane and another end located on the substrate (also known as "bulk"), are known in the art.

The membrane is typically chosen as large as possible for maximizing infrared light reception, the beams must be mechanically sufficiently strong for carrying the membrane, and are typically chosen as long and as small as possible for minimizing heat loss from the membrane through the beams towards the substrate, and are typically made of a material with a relatively low thermal conductivity.

The working principle is as follows: an external object (or subject) emits IR radiation, which typically enters the cavity via a window or aperture in the package, and warms up the membrane, causing a temperature difference ΔT above the bulk temperature, which temperature difference is measured by means of a thermopile, i.e. a plurality of thermocouples connected in series. The thermopile provides a voltage indicative of the temperature difference.

Several different designs are described in the prior art. They can roughly be divided in two groups: a first group where the pressure in the cavity is "high-vacuum" (e.g. less than 100 mPa), and a second group where the pressure in the cavity is much higher, often referred to as "not high-vacuum" or "low vacuum", typically having a pressure higher than 100 Pa (1 mbar). High vacuum devices typically provide larger signals, but require a more expensive sealing technique.

US2011/0174978 describes a thermal infrared sensor, some embodiments of which are replicated in this document as FIG. 1(a) to FIG. 1(d), illustrating some examples of thermal infrared sensors available on the market. Although several designs are shown for obtaining a good performance of the thermal sensor, further optimization still seems possible. In view of the importance for thermal infrared sensors for having good detectability and/or reduced stress, there is still room for improvement.

SUMMARY OF THE INVENTION

It is an object of embodiments of the present invention to provide an infrared sensor and/or an infrared thermal pixel with a good performance, in particular in terms of signal-to-noise ratio.

It is also an object of embodiments of the present invention to provide an infrared sensor and/or infrared thermal pixel with a reduced stress.

This objective is accomplished by a method and device according to embodiments of the present invention.

The present invention relates to an infrared thermal sensor for detecting infrared radiation, the infrared thermal sensor comprising: a substrate and a cap structure together forming a sealed cavity, a membrane arranged in said cavity for receiving infrared radiation (IR) through a window or aperture, a plurality of beams for suspending the membrane, each beam of the plurality of beams comprising at least one thermocouple arranged therein or thereon for measuring a temperature difference (ΔT) between the membrane and the substrate due to the infrared radiation, wherein: the plurality of beams comprises at least two beams having a different length and wherein each of the thermocouples in or on the plurality of beams have a substantially same constant width to length ratio, and wherein each of the beams form a straight connection between a first anchor point on a side of the cavity and a second anchor point on the membrane; and wherein the beams are oriented in a direction offset from a radial direction with respect to a center of the membrane.

In other words, beams located on opposite sides of the membrane are not co-linear. The longitudinal direction of the beams may for example form an angle of at least 5°, or at least 10°, or at least 15° with respect to an imaginary line drawn through the first or second anchor point and the centre of the membrane.

It is an advantage of orienting the beam in a direction other than a radial direction, because such an arrangement allows the membrane to rotate, thereby reducing stress. The stress may be caused for example by a different expansion or compression of the membrane and/or beams due to a temperature difference between the membrane and the bulk.

The filling factor of the membrane in the cavity may be less than 50%.

The pressure in the cavity may be in the range of 500 Pa to 20 kPa.

The actual value of W/L may be determined for a given membrane, a given cavity and a given gas medium and gas pressure.

The beams in the plurality of beams may be selected so that a ratio of the thermal resistance between the membrane and the substrate via radiation and convection and conduction through the gas medium in the cavity and through the part of the beam other than through the thermocouples, and the combined thermal resistance between the membrane and the substrate through the thermocouples via conduction is a value in the range of 0.9 to 1.1.

The membrane may be substantially circular in cross section in a plane parallel with the substrate.

The cavity may have a substantially polygonal cross section with a number (Nc) of corners in a plane parallel with the substrate, and wherein the number (Nb) of beams may be selected as a multiple of the number of corners (Nc).

The polygonal may be a square.

The number (Nb) of beams may be an odd multiple of four but at least twelve, four of said beams having an anchor point in a corner of said square cavity, the other at least eight beams being located on opposite sides of said four beams.

The number (Nb) of beams may be an even multiple of four.

Each thermocouple may consist of an n type poly-silicon resistor in combination with a p type poly-silicon resistor, placed on top of each other.

All the thermocouples may be connected in series for providing a combined voltage signal.

Each beam may have two or more thermocouples next to each other, and each thermocouple may consist of an n type poly-silicon resistor in combination with a p type poly-silicon resistor, placed on top of each other.

The present invention also relates to an infrared sensor system comprising at least one infrared thermal sensor as described above.

The present invention furthermore relates to the use of an infrared thermal sensor as described above for determining the temperature of an object.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1A:
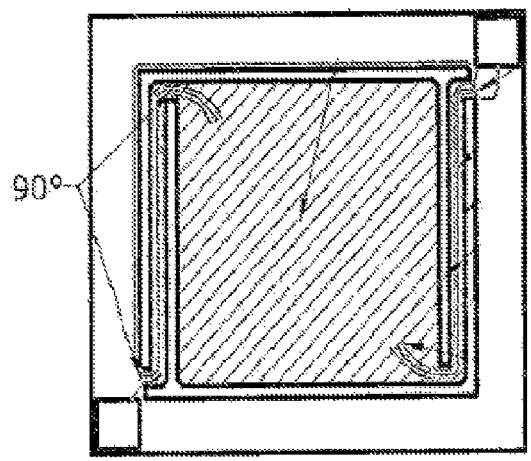
FIG. 1(a) to FIG. 1(d) show four embodiments of a prior art infrared thermal pixel, wherein a square membrane is suspended by two beams, and wherein the beam length is 1×, 2×, or 3× the length of the size of the membrane.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in this document reference is made to "high vacuum", reference is made to a pressure lower than 100 mPa.

Where in embodiments of the present invention the term "beam" is used, sometimes only the beam material but not the material of the thermocouple legs is meant, while sometimes the total beam is meant, including the thermocouple legs. It will be clear from the context which meaning is intended. When describing mechanical aspects, typically the total beam is meant, including the material of the thermocouples, whereas when describing electrical and/or thermal aspects, distinction is typically made between the beam material on the one hand, and the material of the thermocouple legs on the other hand.

In the present invention, the term "filling ratio" or "filling factor" can be determined as the surface area spanned by the membrane compared to the cross-sectional surface area present in the cavity (not taking into account the beams), as can be determined in a plane substantially parallel to the substrate. The cross-sectional surface area considered typically is the cross-sectional surface of the cavity in the plane where the membrane is suspended.

In the present invention, the unit of 1 bar corresponds to 10^5 Pa=100 000 Pa, and 1 mbar corresponds to 100 Pa.

Figure 1B:
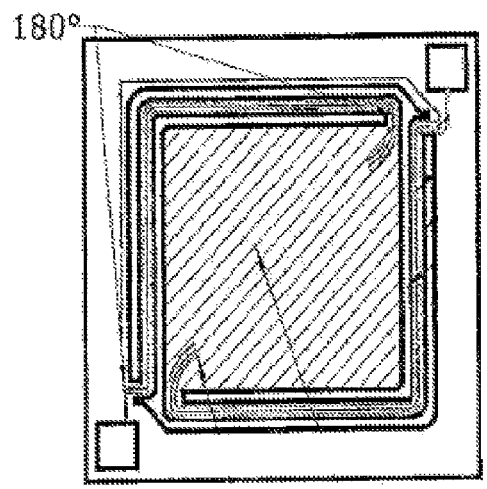
Figure 1C:
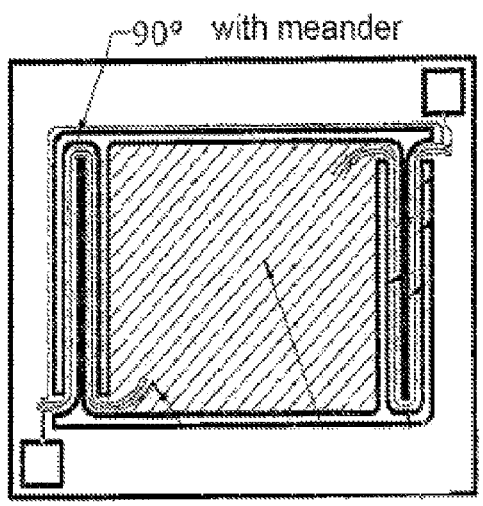
Figure 1D:
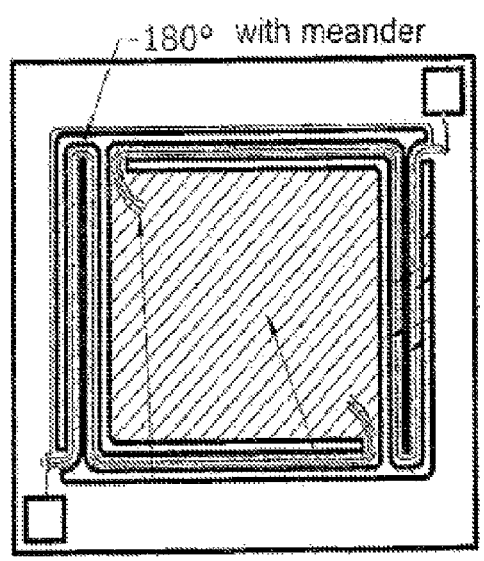

In order to illustrate the features and advantages of embodiments of the present invention, first some thermal infrared sensors are discussed known in prior art. FIG. 1(a) to FIG. 1(d) represent four embodiments of prior art infrared thermal pixels, all having a cavity with a square/rectangular circumference, a substantially square/rectangular membrane (in the middle) which is completely filling the space of the cavity except for the space taken by the beams and a small spacing on both sides of the beams. The membrane is suspended by two narrow beams, each carrying three thermocouples connected in series to form a thermopile. The beam length of the embodiment of FIG. 1(a) is substantially equal to 1× the length of the side of the membrane, and a small spacing is present on both sides of the beam. FIG. 1(b) shows a variant of the thermal pixel of FIG. 1(a) wherein the length of each beams is twice the length of the side of the membrane. FIG. 1(c) shows a variant of the pixel of FIG. 1(b) wherein the length of the beams is also twice the length of the side of the membrane, but wherein the beam is shaped as a meander. FIG. 1(d) shows yet another variant, whereby the length of the beams is 2× the width plus 1× the length of the membrane. Nevertheless, for the reader confronted with these different designs, it is not clear which length of the beams should be chosen for an optimal design.

The question of how the beams and thermocouples should ideally be designed to obtain an "optimal sensor" (e.g. in the sense of signal-to-noise ratio) becomes even more difficult to answer for a sensor in which the membrane has an area substantially smaller than the cavity, e.g. having a filling ratio of 50% or less, and/or has a non-rectangular shape, e.g. a circular shape. This is a problem the inventors were confronted with. Another problem the inventors were confronted with is that of stress mainly due to the temperature difference between the membrane and the bulk.

Figure 2:
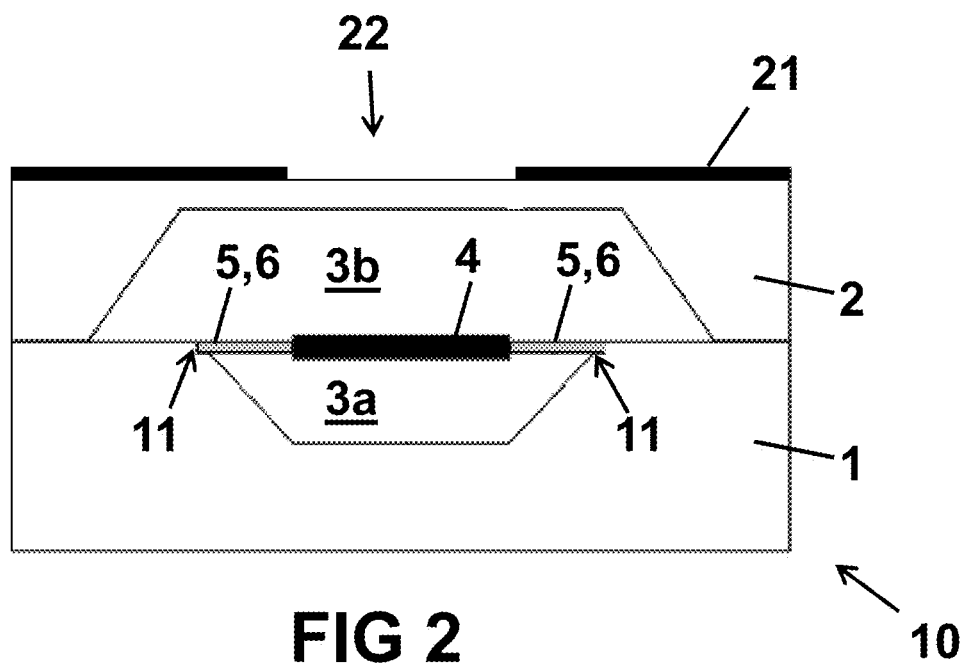
FIG. 2 is a schematic representation of an infrared thermal sensor with its main components, in cross section.

Before discussion the solutions proposed by the present invention, the basic structure of an exemplary thermal sensor 10 is explained with reference to FIG. 2. Whereas embodiments of the present invention are not strictly limited by all features in the exemplary thermal sensor, the principles of embodiments of the present invention can for example be easily applied to a thermal sensor as shown. FIG. 2 shows an infrared thermal pixel 10 comprising a substrate 1 (also called "bulk"), where a relatively thin structure 4, referred to as "diaphragm" or "membrane" 4 is formed, which is connected to the substrate 1 by means of so called "beams" 5 (also known as "webs"). The substrate material under the beams 5 and under the membrane 4 is preferably completely removed by means of known techniques, e.g. by etching techniques, leaving a cavity 3a underneath the membrane 4 and the beams 5. A cap structure 2, made of a material transparent to infrared (IR) light, and having a cavity 3b typically is placed above the membrane 4, and is sealed to the substrate 1, so that the membrane 4 and the beams 5 are encapsulated in a closed cavity 3 (combination of cavity 3a and 3b). The pressure "p" inside the cavity 3, and the gas composition inside the cavity 3 may be largely determined by the sealing technique used, but has an important impact on the design and performance of the infrared thermal sensor. In fact, two major sealing techniques are typically used for infrared thermal sensors: (1) metallic or eutectic layer bonding, providing a "high-vacuum" pressure in the cavity 3, or (2) glass-frit wafer bonding, resulting in a typical pressure of about 10 to 100 mbar (1 kPa to 10 kPa). Although "air" can be used as the gas composition, some prior art devices use a special gas having a low thermal conductivity, such as e.g. Krypton gas, for improving the performance. Most of the cap structure 2 is covered with a non-transparent material 21, except for an "opening" 22 (also known as "aperture" or "window") for allowing IR light to reach the membrane 4.

The size and/or shape of the membrane 4 can in principle be chosen for various reasons, for example: to absorb as much radiation as possible, not to lose too much heat through the air, the smaller the membrane the longer the beams, field of view. To optimize the membrane for a certain field of view, the aperture 22 typically also is taken into account. The distance between the aperture 22 and the membrane 4 has also an influence. When this distance is higher, the aperture 22 and the membrane 4 can be larger for the same field of view. However, for the present invention it is assumed that the cavity 3 (and aperture 22 and pressure and gas composition) and the membrane 4 (size and shape) are predetermined, and that only the beams 5 and the thermocouples 6 can be determined. The task of the inventors is thus to find a suitable, e.g. most suitable set of beams and thermocouples, e.g. in terms of signal-to-noise ratio and/or stress. The sensor 10 shown is of the type where the circumference of the membrane 4 is located within the circumference formed by the cavity 3, and is located at a distance therefrom, which distance is bridged by the beams 5, in contrast to some prior art devices, where the membrane 4 has a circumference larger than the circumference of the cavity, and wherein the membrane is "resting" on the substrate rather than being suspended by beams spanning the distance between the membrane and the bulk.

Figure 3:
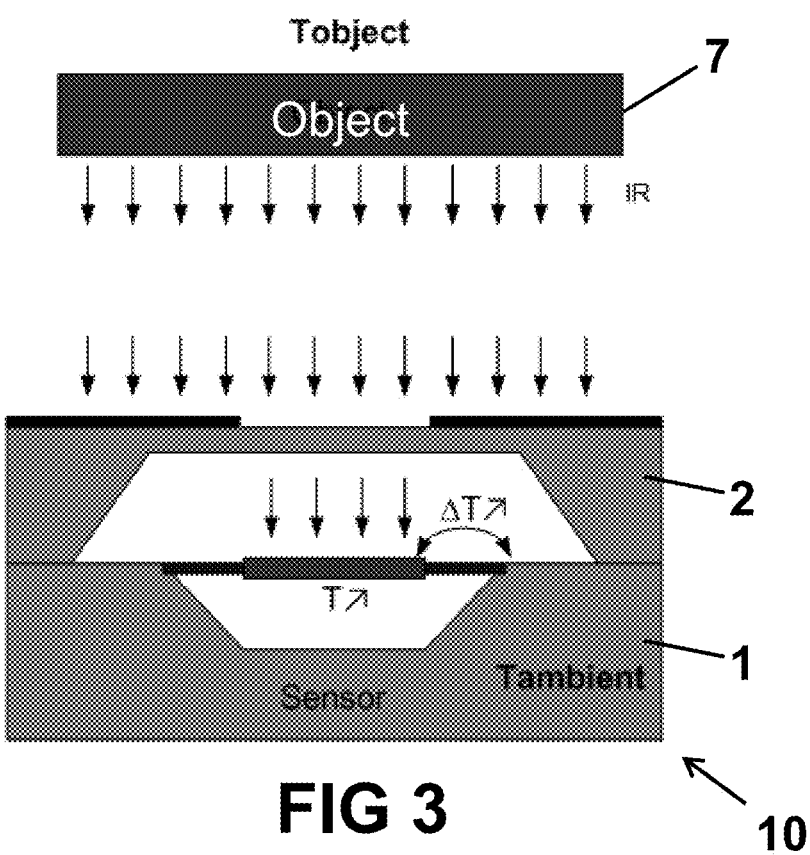
FIG. 3 illustrates how an external object (or subject) sends IR radiation through a window or aperture towards the membrane, which warms up.

FIG. 3 shows the exemplary IR thermal sensor of FIG. 2 and an external object 7 which is to be detected or for which its temperature $T_{object}$ is to be determined. Every object with a temperature higher than 0 Kelvin will radiate infrared (IR) radiation. Depending on the temperature of the object ($T_{object}$), the amount of infrared radiation sent by the object 7 and received by the sensor 10 will vary. Therefore, by measuring the amount of radiation, the temperature difference between the object and the sensor can be determined. By optionally also determining the absolute temperature of the substrate 1 using known techniques, the absolute temperature of the object 7 can be determined. The infrared radiation IR is absorbed on a membrane 4 which is substantially thermally isolated from the bulk 1 by means of the cavity. The membrane 4 will heat up due to absorption of this IR radiation. The temperature difference may e.g. be in the order of 20 mK for an object having a temperature of about 60° C. in an environment of about 20° C. The infrared radiation typically is blocked from the surrounding bulk 1 by an aperture layer 21 so that the bulk material 1 will not heat up due to the infrared radiation. It is noted that the bulk material is very big compared to the dimensions of the membrane 4, and can be seen as a heat sink having a substantially constant temperature equal to the temperature of the environment. The substrate 1 can e.g. be silicon, or other suitable semiconductor materials.

If the object 7 is warmer than the environment of the sensor 10, there will be more IR radiation emitted from the object 7 to the sensor than vice versa. This IR radiation will be absorbed by the membrane 4 and therefore the membrane 4 will (slightly) warm up. Because the temperature of the bulk 1 is substantially constant and equal to the ambient temperature, the temperature of the membrane 4 will increase by an amount of $\Delta T$ above the temperature of the substrate 1, which temperature difference $\Delta T$ can be measured, and is an indication of the IR radiation emitted by the object 7, which in turn is an indication of the temperature of the object 7.

Figure 4:
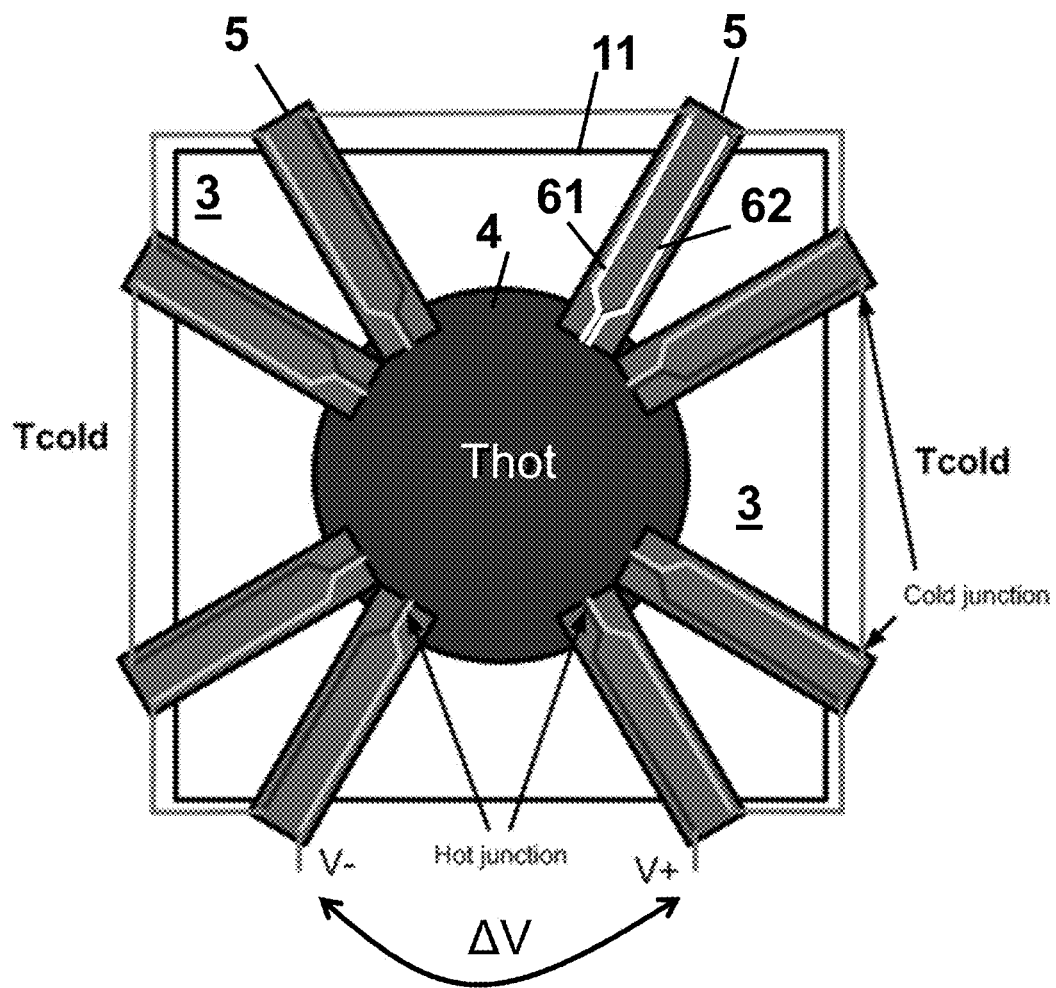
FIG. 4 shows how thermocouples located on the beams convert the temperature difference in a voltage signal.

Referring to FIG. 4, the temperature difference $\Delta T$ between the membrane 4 and the bulk 1 can be measured by placing thermocouples 6 between the membrane 4 and the bulk 1. As is well known in the art, a thermocouple 6 typically comprises or consists of two thermocouple-legs 61, 62 made of a different material, and will generate a voltage difference $\Delta V$ due to the Seebeck effect, which voltage difference $\Delta V$ is dependent on the temperature difference $\Delta T$ between the two nodes of the thermocouple, (and on the materials used for the thermocouple-legs, but the materials are predetermined), but is independent of the length and/or width of the thermocouple wires 61, 62, also known as "thermocouple legs" (assuming no current is flowing). The voltage $\Delta V$ generated by a single thermocouple is typically very small (order of micro-volts for a temperature difference $\Delta T$ of e.g. 40° C.).

The thermocouple legs 61, 62 may e.g. be constructed of n and p type poly-silicon. The voltage $\Delta V$ created by a single thermocouple 6 is then calculated in the following way:

$$\Delta V = \alpha * (T_{hot} - T_{cold})$$

$$\alpha = \pm cst * \ln\left(\frac{\rho}{\rho_0}\right)$$

where $T_{hot}$ is the temperature of the membrane 4, $T_{cold}$ is the temperature of the bulk 1, $\rho$ is the thermal resistivity of the poly-silicon, $\rho_0$ and cst are constant values, whereby the positive sign is selected for p type silicon and the negative sign is selected for n type silicon. By connecting the legs 61, 62 of a thermocouple 6 together, the voltage differences are summed. By connecting multiple thermocouples 6 in series (the series connection being known as a "thermopile"), a larger voltage difference is created.

It is noted that the thermocouples 6 also have a certain electrical resistance depending on the doping level. Placing all the thermocouples 6 in series will also place these electrical resistances in series. The total electrical resistance will therefore be the sum of the electrical resistances of each thermocouple 6. The thermal noise (also known as "Johnson noise") generated by the thermopile is proportional to the square-root of this total electrical resistance.

Although from the description above, it may at first sight seem clear (at least from an electrical point of view) how the total signal $\Delta V$ is generated, and how the total noise is generated, in practice it is not at all simple to design a good infrared thermal sensor 10, or to improve the SNR of an existing infrared thermal sensor 10, because, even if the cavity 3 (e.g. size and shape) and the pressure is fixed, the membrane 4 (e.g. material, size and shape) and the beams 5 (e.g. material, number, length, width) and the thermocouples 6 (e.g. material, number, length, width) influence the thermal behaviour of the membrane 4, and thereby also the temperature difference $\Delta T$, which in turn has an impact on the voltage $\Delta V$. It is therefore not at all easy to predict how a particular design-change of the beams will influence the SNR, because of the mutual interaction between the electrical, thermal, and (to a lesser degree) also the mechanical aspects of the beams 5.

Figure 5A:
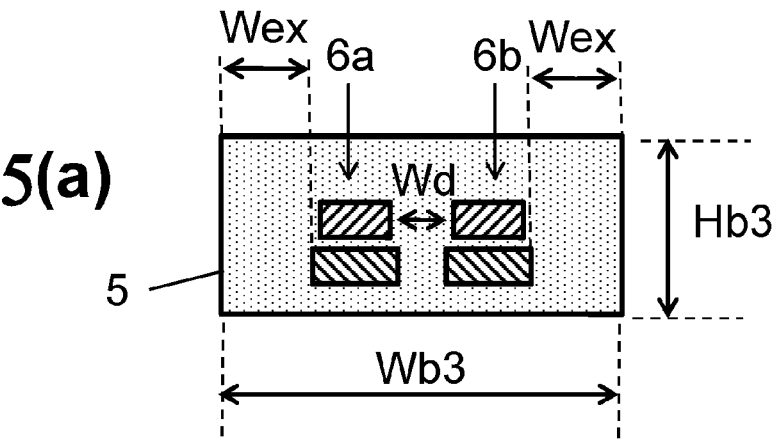
FIG. 5(a) to FIG. 5(c) shows several possible ways to arrange thermocouples on beams.
Figure 5B:
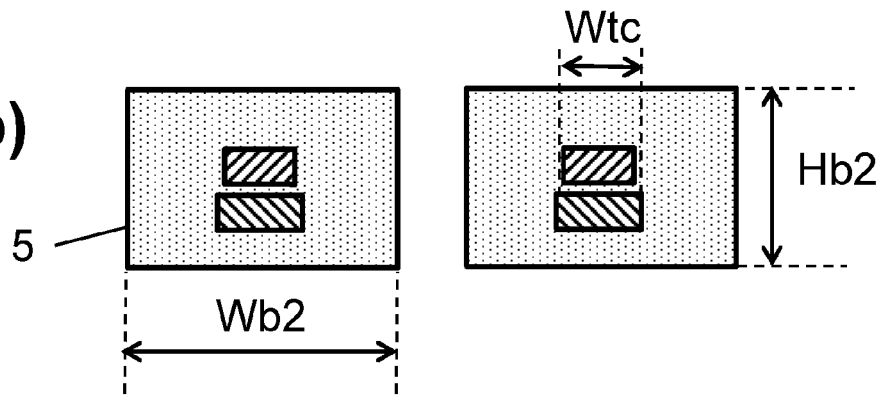
Figure 5C:
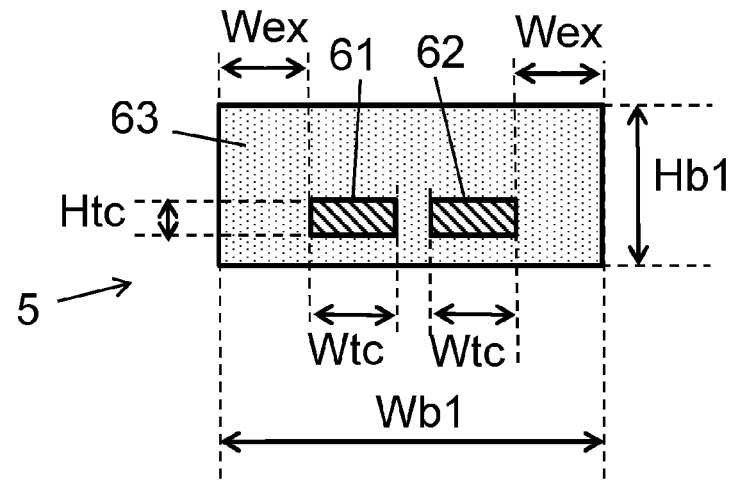

FIG. 5(a) to FIG. 5(c) show several possible ways of how thermocouples 6 can be arranged in or on beams 5, however, the invention is not limited to these examples, and other arrangements may also be used. These drawings are not drawn to scale. The beam of FIG. 5(c) has a single thermocouple 6 with two thermocouple legs 61, 62 arranged next to each other. In the example shown, the beam has a width wb1, and comprises an n type and p-type poly-silicon resistor 61, 62 to make the thermocouple 6, but there is also extra passivation material 63, e.g. nitride and oxide placed around the poly-silicon, which forms the actual beam. The passivation material 63 typically has a thermal resistivity higher than that of the material of the thermocouple legs 61, 62. The width $W_{ex}$ of this passivation $W_{ex}$ is preferably chosen as small as possible for minimizing the thermal conductance of the beam (in its longitudinal direction), and may e.g. be chosen to be about 1.5 micron for avoiding etching of the thermocouples during the under-etching of the membrane and the beams during production. In a standard CMOS process, a typical height of the thermocouple legs $H_{tc}$ is about 0.3 micron, and a typical height of the beam $H_{b1}$ is e.g. about 7 micron. The width of the thermocouple legs $W_{tc1}$ and $W_{tc2}$ is preferably equal, and can be chosen by design within a large range, e.g. in the range of 5 micron to about 50 micron, and even beyond this range.

As can be seen in FIG. 5(b), the two thermocouple legs 61, 62 may also be arranged on top of each other, in which case the width of the beam 5 can be reduced to a width $W_{b2}$ smaller than the width $W_{b1}$ of the beam of FIG. 5(c), assuming the same width $W_{tc}$ of the thermocouple legs. This is advantageous because in this way the thermal resistance of beam material 63, excluding the thermocouples, is reduced, and therefore also the total thermal resistance of the beam including the thermocouples), because the thermocouple legs 61, 62 of FIG. 5(b) have the same dimensions as those of FIG. 5(c). In view of the small thickness of the thermocouple legs (poly-silicon layer), it is noted that the decrease in width $W_{b2}$ far out weights the small increase in height $H_{b2}$.

One can go one step further, as illustrated in FIG. 5(a) where two thermocouples 6a, 6b, each having two legs located on top of each other, are arranged in or on a single beam 5. As can be seen, by doing so, the beam width can be further reduced to a width $W_{b3}$ less than twice the width $W_{b2}$, and hence the thermal resistance of the beam (excluding the thermocouples), as well as the total thermal resistance of the beam including the thermocouples, can be further increased. Although not shown, it is also possible to place more than two thermocouples next to each other on a single beam, by adding another interdistance $W_d$ and thermocouple width $W_{tc}$.

From an electrical point of view, it should be mentioned that the beam material 63 (e.g. comprising nitride and/or oxide) is an electrical insulator, hence the electrical resistance of the total beam is only determined by the thermocouple legs 61, 62. Since the length and width and height of the thermocouple legs is substantially identical in each of FIG. 5(a) to FIG. 5(c), also the thermal noise generated by these thermocouples is substantially identical. For completeness, it is noted that the width of the upper thermocouple leg in FIG. 5(b) is in practice slightly smaller than that of the underlying thermocouple leg, due to processing constraints, but in this case the average width $W_{tc}$ of the thermocouple legs is taken as "the" thermocouple width.

From a mechanical point of view, it should be mentioned that the beams may have a typical height of 7 µm, the invention not being limited thereto, while the thermocouple legs 61, 62 are typically only about 0.3 µm thick, hence the height $H_{b3}$ of the beam of FIG. 5(a) is identical to the height Hb2 of the beam of FIG. 5(b), which is typically only slightly larger than the height Hb1 of the beam of FIG. 5(c). Since the width Wb3 of the beam of FIG. 5(a) is slightly smaller than twice the width Wb2 of the beams of FIG. 5(b), it is mechanically only slightly weaker. Likewise, one beam of FIG. 5(b) is only slightly weaker than the beam of FIG. 5(c).

In a first aspect, the present invention relates to an infrared thermal sensor 10 for detecting infrared radiation. The infrared thermal sensor 10 may comprises features and advantages of the exemplary system as described above, although embodiments are not limited thereto. According to embodiments of the present invention, the infrared thermal sensor comprises a substrate 1 and a cap structure 2 together forming a sealed cavity 3. A membrane 4 is arranged in the cavity 3 for receiving infrared radiation (IR) through a window or aperture 22. The infrared thermal sensor 10 furthermore comprises a plurality of beams 5 for suspending the membrane 4 wherein each beam 5 of the plurality of beams comprises at least one thermocouple 6 arranged therein or thereon for measuring a temperature difference (ΔT) between the membrane 4 and the substrate 1 caused by incident infrared radiation to be detected. According to embodiments of the present invention, the plurality of beams 5 comprise at least two beams having a different length. Further according to embodiments of the present invention each of the thermocouples 6 of the plurality of beams have a substantially same constant width to length ratio.

It was surprisingly found that the signal to noise ratio SNR of the measured signal, e.g. the voltage provided by a thermopile formed by the thermocouples, significantly benefits for a given design of an infrared thermal sensor having different beam lengths, by choosing W/L constant for all thermocouples of those beams. This is quite in contrast with the common believe that the best performance for high vacuum thermal infrared sensors 10 is obtained by choosing the membrane area "as large as possible" (high filling ratio), and the beams "as long as possible" and "as narrow as possible" (high thermal resistance) without losing mechanical strength.

When trying to explain the behavior, following considerations could be taken into account, although embodiments of the present invention are not bound thereby. By keeping the W/L of the thermocouples constant for all the beams, the thermal resistance measured between the membrane and the substrate is also substantially constant for each beam, and at the same time, the electrical resistance measured between the membrane and the substrate is substantially constant for each beam. By choosing beams having thermocouples with a substantially constant W/L, i.e. that longer beams are wider, and shorter beams are narrower, each beam has substantially the same thermal resistance, so that each beam conducts substantially the same amount of heat from the membrane towards the substrate, when in use. This helps to keep the temperature difference ΔT between the membrane and the bulk as large as possible, and the temperature difference over the ends of each thermocouple substantially constant. Hence each thermocouple provides substantially the same voltage signal, and a more reliable measurement can be obtained as the contribution of the different thermocouples to the overall measured signal is the same for each thermocouple.

At the same time, thermocouples with a constant W/L provide a substantially constant electrical resistance for each thermocouple (and hence also for each total beam). Since thermal noise (also known as "Johnson noise") is proportional to the square-root of electrical resistance, this means that each thermocouple contributes in the same manner to the total noise of the total signal.

Assuming that the temperature over the membrane is the same for all thermocouples, this can intuitively be understood as follows: If longer beams would not be proportionally wider, but all beams would have a constant width, the electrical resistance of the thermocouples on the longer beams would also be higher (than for shorter beams), and thus also the noise created thereby would be higher, while the voltage signal provided by these thermocouples would not increase (same temperature difference), hence the noise of those signals would increase more than the signal, and thus the SNR would be lower as compared to a structure having beams of constant W/L. Stated in other words, choosing W/L constant for each thermocouple is beneficial because, for a given total electrical resistance (and therefore for the same noise level), the thermal resistance of the set of beams with constant W/L can be made higher than for the set of beams with constant W, hence the temperature difference between the membrane and the bulk will be higher. Since the number of thermocouples remains the same for both sets, this means that the signal increases while the noise remains the same, hence the SNR increases.

It is noted that in fact, by keeping W/L of the thermocouples constant, the thermal resistance of all thermocouples are set equal, but the thermal resistance of the total beams (including the passivation material 63 and the material of the thermocouple legs 61, 62) is only approximately constant, because 1) the width of the beam is typically about equal to the width of the thermocouples (apart from e.g. a passivation thickness to avoid etching damage), and 2) the thermal conductance of the thermocouple material is much higher than the thermal conductance of the beam material, but the latter is not exactly zero.

By way of illustration, the invention not being limited thereto, standard and optional features of examples and/or exemplary embodiments of the present invention will further be described. In general, embodiments of the present invention may—where applicable—comprise one, more or all of the features described in the examples and/or exemplary embodiments.

In embodiments of the present invention, the number Nb of beams as well as their length and width may be chosen as function of one or more of the other parameters defining the infrared thermal sensor, such as for example: membrane size, pressure.

In embodiments of the present invention, the filling factor of the membrane in the cavity may be less than 50%, for example less than 40%. In one example, the filling factor may for example be about 30%. A typical example— embodiments not being limited thereto—may be an infrared thermal sensor with a circular membrane having a diameter of about 255 micron, located in a square cavity having a length size of about 400 micron, hence the filling ratio is (pi×R×R)/(W×W)=about 32%. Such a membrane offers an excellent field-of-view (FOV), provided the aperture used is sufficiently large. As indicated above the pressure in the cavity typically may depend on the manufacturing technique used. It may be in the range of 500 Pa to 20 kPa. According to embodiments of the present invention a good, e.g. optimum design of the beams, taking into account their width over length ratio, can be found for each predefined pressure, also for sensors operating at lower vacuum. As the signal of the thermopile is relatively small and needs to be amplified, the SNR of the original signal is very important. The pressure range may be between 5 to 200 mbar, for example between 10 and 100 mbar (i.e. 1 kPa to 10 kPa). Such a pressure may e.g. occur when glass-frit wafer bonding is used as a technique for sealing the cap to the substrate. The main advantage of such a process is that it provides a high reliability and stable hermetical sealing while allowing to use a simpler (cheaper) process compared to metallic or eutectic layer procedures. Such techniques and resulting devices are very much suitable for volume markets such as consumer electronics and automotive. At a pressure of 5 mbar (500 Pa) or more, the membrane loses a considerable amount of heat through the beams and thermocouples (thermal conduction) but also via the membrane surface (radiation and convection and conduction). The present invention is particularly interesting for these kind of devices.

According to some embodiments of the present invention, the beams in the plurality of beams may be selected so that a ratio of the thermal resistance (RT1) between the membrane and the substrate via radiation and convection and conduction through the gas medium in the cavity and through the part of the beam other than through the thermocouples, and the combined thermal resistance (RT2) between the membrane and the substrate through the thermocouples via conduction is a value in the range of 0.9 to 1.1. The ratio of thermal resistance may in some examples be between 0.95 and 1.05, in other examples even be in the range of 0.99 to 1.01. It is an additional advantage of embodiments of the present invention that the heat transfer from the membrane to the substrate through the thermocouple legs on the one hand, is approximately equal to the sum of the heat transfers in other ways, in particular via the membrane surface by radiation and convection and conduction through the air (or other gas medium), and the heat transfer through the beam material itself (excluding the thermocouple material) via conduction, when in use. The latter may provide an improved SNR as compared to the same infrared sensor (e.g. same cavity, same membrane, same pressure) having a beam structure not satisfying this relationship. The above condition can additionally provide design rules or at least rules of thumb for implementing or improving the beam & thermocouple-structure of an infrared thermal sensor, e.g. may form a further basis for additional parameter selection of parameters such as number Nb, length and widths of the beam(s)—taking into account the constant W/L ratio—and of the thermocouple(s) of an infrared thermal sensor.

The membrane 4 may be substantially circular in cross section in a plane parallel with the substrate 1. Using a circular membrane has the advantage of providing a uniform Field-Of-View. It also provides symmetry (thermally and mechanically), which may also improve the uniformity of the temperature over the membrane. In addition, a circular membrane may be advantageous for underetching reasons.

The cavity may have any suitable shape. In some embodiments, the cavity may have a substantially polygonal cross section with Nc corners in a plane parallel with the substrate. The number Nb of beams may be selected as a multiple of the number Nc of corners. It is an advantage of using a cavity having a regular polygonal shape, because it was found that it facilitates the design. In addition, such a structure provides a more uniform temperature, heat dissipation, etc, which may help to further improve the SNR. The polygonal shape may be a square, although embodiments are not limited thereto.

The number (Nb) of beams may be any suitable number of beams. The number may be adapted to the shape of the cavity, the shape of the membrane, etc.

In one particular example (see e.g. FIG. 7), when the cavity has four corners, an odd multiple of four, e.g. at least twelve beams may be provided. Beams may be substantially located on the diagonals of the cavity. The other beams may be located symmetrically and on opposite sides of said diagonals. In some preferred embodiments, the number of beams may be e.g. 4×3=12, or 4×5=20, or 4×7=28 and the beams may be connected to a circular membrane in a square cavity. It may in some embodiments be advantageous to choose the beams on diagonals and symmetrically to opposite sides of the diagonals because these positions give the largest distance between the substrate edge and the membrane, thus the beams can be relatively long and wide, which is good for mechanical stability. Alternatively, the beams may not be located on the diagonals, but slightly differing therefrom, e.g. slightly translated and/or rotated therefrom (see e.g. FIG. 8), so as to allow the membrane to rotate due to stress and/or thermal expansion, rather than moving away from or towards the substrate (e.g. up and/or down). In that case, the layout is preferably chosen to be rotation-symmetric, i.e. the same layout would be obtained when the top view is rotated over e.g. 90° or 180°. The beams may be linear, but also may have a different shape, e.g. slightly bended. Linear (also called "straight") beams may be advantageous for good mechanical stability, and ease of design (layout, calculations, simulations), and for process reasons (e.g. etching).

In one particular example (see e.g. FIG. 6), embodiments not being limited thereto, the number of beams may be at least sixteen, the beams being divided in groups of eight beams of equal length, the beams of each group being located symmetrically and on opposite sides of the diagonals of the square cavity. By locating the beams close to the diagonals, the length of the beams is relatively large (as compared to other positions), and the width is increased so as to keep the same electrical and thermal resistance, and thus the beams become also mechanically stronger. Alternatively, the beams may not be located on the diagonals, but slightly differing therefrom, e.g. slightly translated and/or rotated therefrom, so as to allow the membrane to rotate due to stress and/or thermal expansion, rather than moving away from or towards the substrate (e.g. in a direction perpendicular to the substrate).

Figure 8:
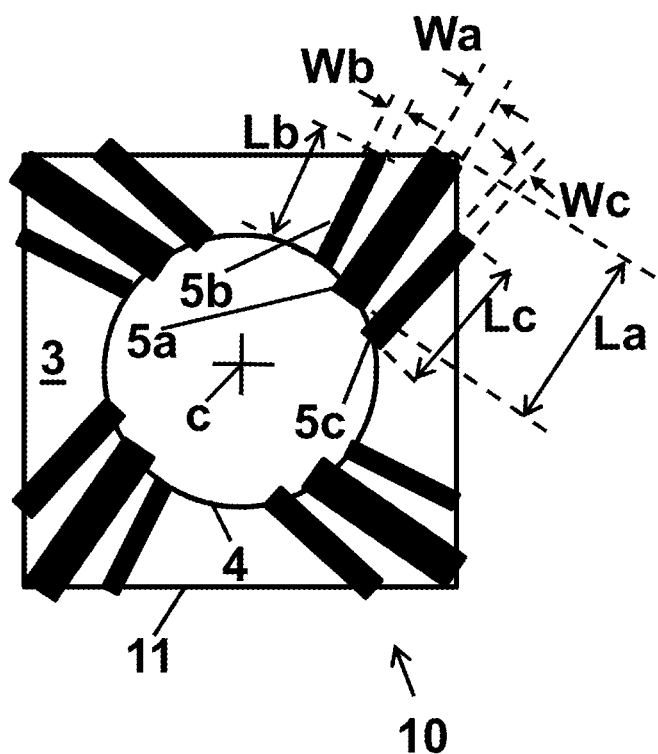
FIG. 8 shows a variant of the infrared thermal sensor shown in FIG. 7, whereby the beams are straight, but are oriented in a direction offset from a radial direction.

In all the embodiments described above, the beams may form a straight connection between a first anchor point (or connection point) at a side of the cavity and a second anchor point on the membrane, and whereby beams positioned at opposite sides of the membrane are not oriented co-linear, or in other words, are not oriented radially. With straight connection is meant that the beam is substantially linear. By not orienting beams in a co-linear way, but by orienting them e.g. under an angle of e.g. 5° to 25° away from the center "c" of the membrane, stress in the sensor can be reduced by allowing rotation of the membrane. This is illustrated in FIG. 8 for a thermal sensor having a circular membrane mounted in a square cavity by means of twelve beams, but the same principle can also be applied to other sensors, having other membranes (e.g. square) and having another number of beams.

The thermocouples used may be all suitable type of thermocouples. One example, embodiments not limited thereto, are thermocouples consisting of an n type poly-silicon resistor in combination with a p type poly-silicon resistor, placed next to each other and/or on top of each other. In an exemplary embodiment, each beam has exactly one thermocouple, or exactly two thermocouples, or exactly three thermocouples, or exactly four thermocouples, but may also have more thermocouples. It may in some embodiments be an advantage that the thermocouple legs (i.e. resistors) of each thermocouple are located on top of each other rather than next to each other, because the width of such a beam can be smaller than a beam having the same thermocouple legs located next to each other, hence the total thermal resistance of the former beam (with the two thermocouples on top of each other) is smaller than that of the latter beam (with the two thermocouples next to each other). It is noted that the electrical resistance (being determined by the length of the thermocouples) is the same for both beams, while the mechanical strength is typically only slightly less (for the beam with the thermocouple legs on top of each other), but in many designs (especially in low vacuum) the mechanical conditions on the beams are more than reached, and thus the beams may be optimized for thermal and electrical aspects. Thus by placing the thermocouple legs on top of each other, the thermal resistance can be reduced, while the electrical resistance is kept substantially the same. This may further help to increase the SNR of the sensor, because the heat dissipation through the thermocouples may come closer to the heat dissipation outside of the thermocouples (e.g. through the beam material, and through the air via radiation, conductance, convection). All the thermocouples may be connected in series for providing a combined voltage signal. A series connection of thermocouples is known as a "thermopile". If the temperature difference over each thermocouple is the same, the combined voltage signal is N times larger than the individual voltage signals, but the SNR is the same, because the electrical resistance is also multiplied by the same factor N. An advantage of connecting them is series is that the signal needs less amplification before further processing. Each beam may have two or more thermocouples next to each other, wherein each thermocouple consists of an n type poly-silicon resistor in combination with a p type poly-silicon resistor, placed on top of each other. It is an advantage to have a number (Nb) of beams with two (or more) thermocouples each, rather than twice that number (2×Nb) of beams each with a single thermocouple, because by "combining" two beams into a single beam, less "excess material" is used on either side of the beam for protecting the thermocouples from being damaged during etching, therefore the width of said one beam can be smaller than the sum of the widths of said two beams, and thus the total thermal resistance will be lower.

In the following part, three particular examples will be described.

Figure 6:
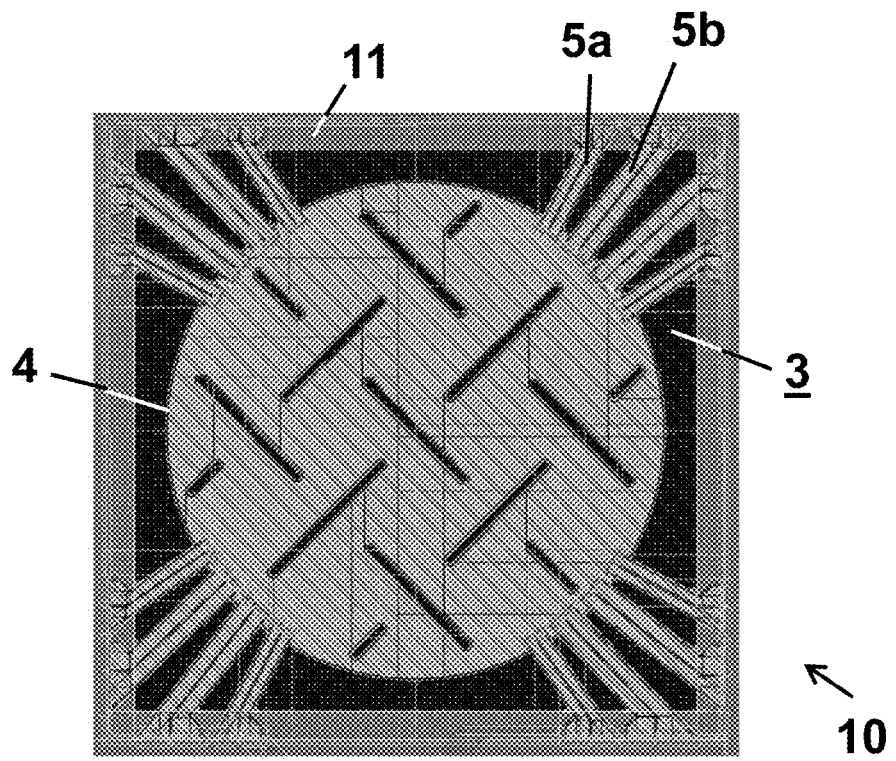
FIG. 6 shows an embodiment of an infrared thermal sensor according to the present invention, having sixteen beams, wherein the longer beams are wider than the shorter beams.

FIG. 6 show an example of an infrared thermal sensor according to an embodiment of the present invention. FIG. 6 is drawn to scale. Nevertheless, it may be understood that whereas some parameter play a critical role, i.e. the ratio of width over length, the specific value of other parameters can be varied. The most important parameters of the exemplary sensor 10 are listed in Table 1, under the heading "design-1". The simulated behaviour of this sensor can be found in Table 2, determined by a simulation that took into account heat dissipation from the membrane 4 through radiation and convection and conduction (through air), and heat dissipation through the beams 5 and thermocouples 6. This sensor 10 uses the thermocouple arrangement of FIG. 5(a) with two thermocouples on the same beam and next to each other, and with the legs of each thermocouple being located on top of each other.

TABLE 1

|  | Design 1 (W/L = constant) | Design 2 (W = constant) |
|---|---|---|
| Pressure (mbar) | 10 | 10 |
| Temp environment (K) | 300 | 300 |
| Temp measured object (K) | 360 | 360 |
| Sensor size (um) | 400*400 | 400*400 |
| Cavity depth under mem (um) | 120 | 120 |
| Cavity height above mem (um) | 125 | 125 |
| Membrane diameter (um) | 357 | 357 |
| Area_membrane_without_slits (um^2) | 99986 | 99986 |
| Area_slits | 10567 | 10567 |
| Area_slits/Area_membrane_without_slits | 0.1057 | 0.1057 |
| # thermocouples | 32 | 32 |
| Length beams (um) | 83.8-56.4 | 83.8-56.4 |
| Width thermocouple (um) | 8.9-6.1 | 7.5 |

As can be seen from Table 1, the sensor 10 is made such that the width over length ratio W/L for each thermocouple leg is kept substantially constant for all the beams. In particular, the longer beams (and thus also the thermocouples) which are located closer to the diagonal of the cavity, have a length of 83.8 um and a width of 8.9 um, while the shorter beams and thermocouples have a length of 56.4 um and a width of 6.1 um. For all the beams W/L is substantially constant, in this case equal to about 9.33+/−1% tolerance. Nevertheless, an advantage in performance as will be discussed is believed to be already substantially obtained within a 5% tolerance margin, or within 3% tolerance margin.

In order to determine the effect of the "W/L being substantially constant" for all the beams, a simulation was made for a second design ("design-2") in which all the thermocouples (and hence also the beams, which are chosen to be 1.5 um wider on either side of the thermocouple, as explained above) have the same width, in this case 7.5 um. It is noted that the width of the beams in design-2 are chosen such that the total electrical resistance is substantially the same for both designs, hence also the noise level is substantially the same, which allows easy comparison.

The simulation results are listed in table 2:

TABLE 2

|  | Design 1 (W/L = constant) | Design 2 (W = constant) |
|---|---|---|
| Sensitivity (uV/K) | 19.024 | 18.487 |
| electrical_resistance (kOhm) | 84.054 | 83.889 |
| thermal_resistance_beams (m^2*K/W) | 11133 | 10763 |
| SNR (dB) | 54.2112 | 53.9711 |

As can be seen from table 2, the thermal resistance of the beams having thermocouples with a constant W/L is higher than the thermal resistance of the beams having thermocouples with a fixed W/L. Since the membrane, cavity, pressure, etc is equally large in both designs, this implies that the temperature difference of the membrane of design-1 is larger than that of Design-2, which results in a SNR improvement of 0.24 dB (on a logarithmic scale). The sensitivity of the sensor of Design-1 is increased by about 3% over Design-2. It is surprising that 3% additional improvement in SNR can be obtained by only choosing a substantially constant W/L for all the beams, taking into account that other parameters were for both designs already selected to result in a good SNR.

Figure 7:
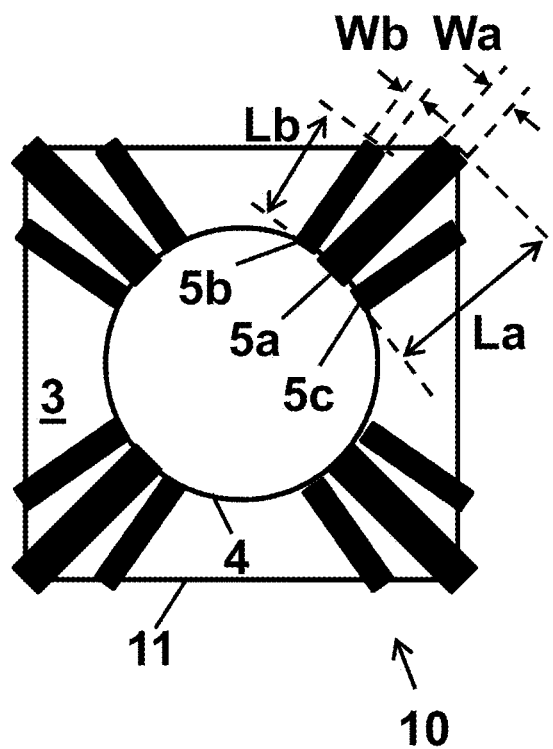
FIG. 7 shows another embodiment of an infrared thermal sensor according to the present invention, having twelve beams, four beams being arranged as diagonals.

FIG. 7 shows another example of an infrared thermal sensor 10 according to embodiments of the present invention. It has a square cavity 3, a circular membrane 4, and twelve beams in total, whereby three beams 5a, 5b, 5c are organized in each corner of the cavity, one of these three beams, namely beam 5a is located on a diagonal of the square cavity 3, and is longer than the two other beams 5b, 5c. The other two beams are located on opposite sides of the diagonal. The lengths and widths of the thermocouples of said beams are chosen such that $W_a/L_a$ is substantially equal to $W_b/L_b$ (within 5% tolerance, e.g. within 3% tolerance, e.g. within 1% tolerance), where $W_a$ is the width of each thermocouple leg (or thermocouple) on the beam 5a, and $W_b$ is the width of each thermocouple leg on the beams 5b and 5c. It was again found that an improved SNR as compared to the same sensor with twelve beams, located at the same location, but having an equal width for different lengths.

FIG. 8 shows a variant of the infrared thermal sensor of FIG. 7, having linear beams, four beams being connected to the corners of the square cavity, and all beams having a constant W/L as described above, but in addition, at least some of the beams, preferably all the beams are oriended non-radially, so as to allow the membrane to rotate, e.g. due to thermal expansion of the membrane and the beams due to the temperature difference between the membrane and the bulk, thereby reducing stress. This also reduces the risk of breaking, not only during the production of the sensor, but also during actual use, especially if the sensor is subjected to additional mechanical stress e.g. caused by acceleration (e.g. when used in a handheld device that falls on the ground).

In a second aspect, the present invention also relates to an infrared sensor system. Such a system according to embodiments of the present invention comprises at least one infrared thermal sensor as described in the first aspect. Other features may be as those known by the person skilled in the art. An example of such a system is a mobile device or a portable device having such an infrared thermal sensor for measuring the temperature of an object. Examples of such mobile devices are for example PDA's, laptops, mobile phones, smart phones, etc.

In a third aspect, the present invention also relates to the use of an infrared thermal sensor as described above for determining the temperature of an object.

The invention claimed is:

1. An infrared thermal sensor for detecting infrared radiation, the infrared thermal sensor comprising:
 a substrate and a cap structure together forming a sealed cavity;
 a membrane arranged in said cavity for receiving infrared radiation through a window or aperture;
 a plurality of beams for suspending the membrane, each beam of the plurality of beams comprising at least one thermocouple arranged therein or thereon for measuring a temperature difference between the membrane and the substrate due to the infrared radiation;

wherein:
 the plurality of beams comprises at least two beams having a different length;
 and wherein each of the thermocouples in or on the plurality of beams have a substantially same constant width to length ratio;
 and wherein each of the beams form a straight connection between a first anchor point on a side of the cavity and a second anchor point on the membrane;
 and wherein the beams are oriented in a non-radial direction with respect to a center of the membrane.

2. The infrared thermal sensor according to claim 1, wherein the filling factor of the membrane in the cavity is less than 50%.

3. The infrared thermal sensor according to claim 1, wherein the pressure in the cavity is in the range of 500 Pa to 20 kPa.

4. The infrared thermal sensor according to claim 1, wherein the beams in the plurality of beams are selected so that a ratio of the thermal resistance between the membrane and the substrate via radiation and convection and conduction through the gas medium in the cavity and through the part of the beam other than through the thermocouples, and the combined thermal resistance between the membrane and the substrate through the thermocouples via conduction is a value in the range of 0.9 to 1.1.

5. The infrared thermal sensor according to claim 1, wherein the membrane is substantially circular in cross section in a plane parallel with the substrate.

6. The infrared thermal sensor according to claim 1, wherein the cavity has a substantially polygonal cross section with a number of corners in a plane parallel with the substrate, and wherein the number of beams is selected as a multiple of said number of corners.

7. The infrared thermal sensor according to claim 6, wherein the polygonal is a square.

8. The infrared thermal sensor according to claim 7, wherein the number of beams is an odd multiple of four but at least twelve, four of said beams having an anchor point in a corner of said square cavity, the other at least eight beams being located on opposite sides of said four beams.

9. The infrared thermal sensor according to claim 1, wherein the number of beams is an even multiple of four.

10. The infrared thermal sensor according to claim 1, wherein each thermocouple consists of an n type poly-silicon resistor in combination with a p type poly-silicon resistor, placed on top of each other.

11. The infrared thermal sensor according to claim 1, wherein all the thermocouples are connected in series for providing a combined voltage signal.

12. The infrared thermal sensor according to claim 1, wherein each beam has two or more thermocouples next to each other, and wherein each thermocouple consists of an n type poly-silicon resistor in combination with a p type poly-silicon resistor, placed on top of each other.

13. The infrared thermal sensor according to claim 1, wherein all the thermocouples are connected in series for providing a combined voltage signal indicative for the effect of the infrared radiation.

14. An infrared sensor system comprising at least one infrared thermal sensor according to claim 1.

15. Use of an infrared thermal sensor according to claim 1 for determining the temperature of an object.

* * * * *